(No Model.)
J. J. LOONEY.
PROCESS OF BURNING PETROLEUM.
No. 542,590. Patented July 9, 1895.
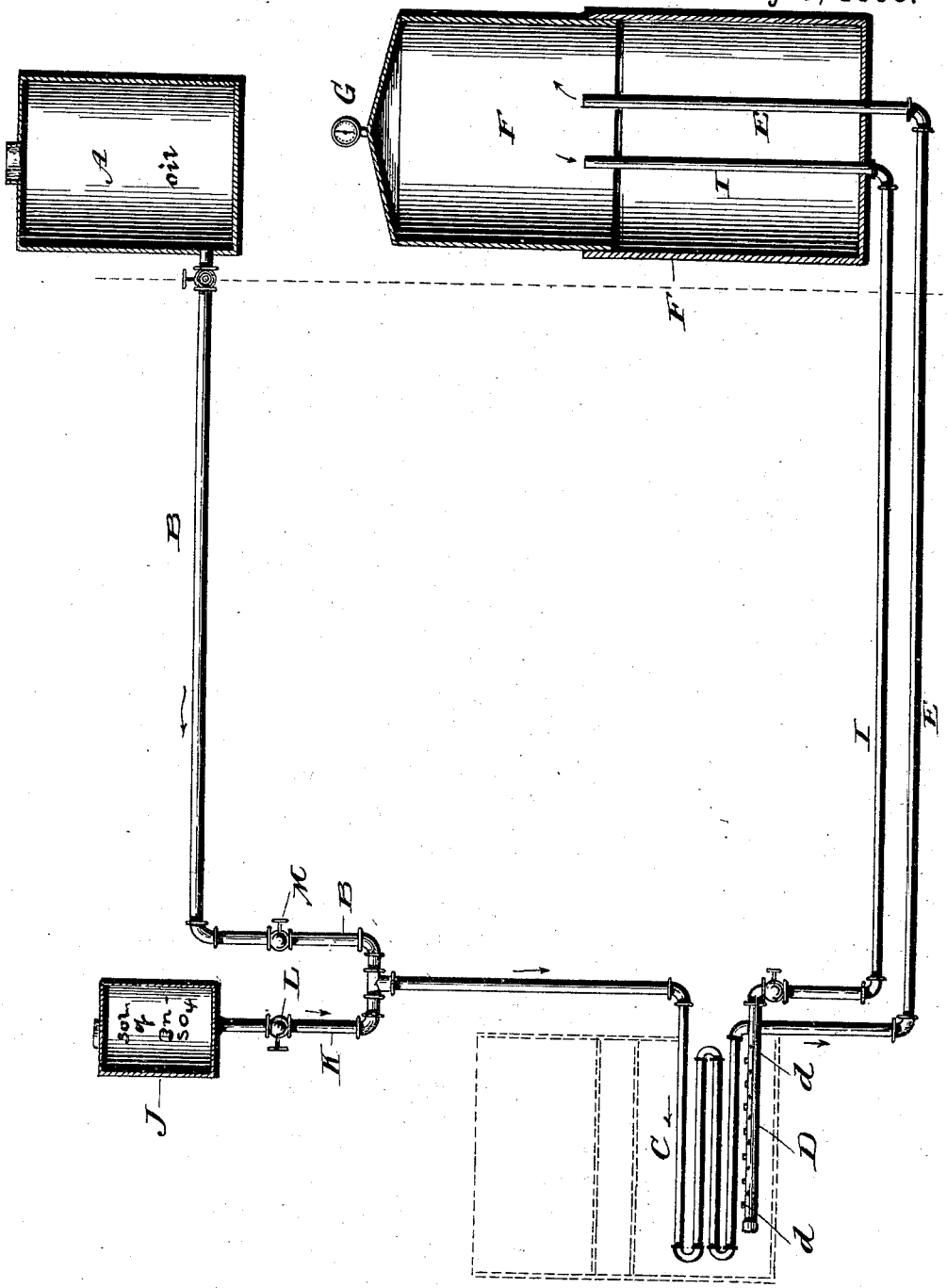
Witnesses
L. C. Hills
A. L. Hough
Inventor
John J. Looney,
by Franklin H. Hough
Atty.

UNITED STATES PATENT OFFICE.

JOHN JAY LOONEY, OF COLUMBIANA, OHIO.

PROCESS OF BURNING PETROLEUM.

SPECIFICATION forming part of Letters Patent No. 542,590, dated July 9, 1895.

Application filed May 5, 1894. Serial No. 510,201. (No model.)

*To all whom it may concern:*

Be it known that I, JOHN JAY LOONEY, a citizen of the United States, residing at Columbiana, in the county of Columbiana and State of Ohio, have invented certain new and useful Improvements in Apparatus for Burning Petroleum-Oil; and I do declare the following to be a full, clear, and exact description of the invention, such as will enable others skilled in the art to which it appertains to make and use the same, reference being had to the accompanying drawing, and to the letters of reference marked thereon, which form a part of this specification.

This invention relates to certain new and useful improvements in processes of burning petroleum as a fuel in stoves, furnaces, and other heaters; and it consists in mixing with the crude petroleum a solution of zinc sulphate as it flows through the pipes, then subjecting the pipes to heat, so as to convert the oil into gas, and catching the gas in a gasometer, from which it is conducted to the burner.

The object of my invention is to mix with the crude oil, as it flows through the coil to be subjected to heat, a solution of zinc sulphate for the purpose of preventing the carbonizing of the oil and stopping up of the tubes.

The invention is clearly illustrated in the accompanying drawing, which, with the letters of reference marked thereon, forms a part of this specification, and which drawing represents a vertical longitudinal sectional view of an apparatus embodying my invention.

Reference being had to the details of the drawing by letter, A designates an oil-tank; B, a conducting-pipe leading from the said tank to a fire-box, where the pipe is formed in convolutions C about the interior of the box, so as to present as much surface as possible to the heat of the burning gas at the burners D. After the oil becomes gaseous by the action of the heat, it is conducted through the continuous pipe E to a storage-reservoir F, which has a suitable pressure-gage G. From this receptacle the gas is conducted through the pipes I to the burner, which is provided with perforations $d$.

J is a tank holding a solution of sulphate of zinc.

K is a pipe leading to and having connection with the supply-pipe B, where the solution is conducted for mixture with the petroleum.

L is a stop-cock in the pipe K, and M is a stop-cock in the pipe B to regulate the supply.

But a very small quantity of the sulphate of zinc is necessary, and its flow from the tank J is regulated by the stop-cock L, and a part of the carbon of the oil is oxidized by the highly-heated watery vapor given off by the zinc sulphate to carbon-monoxide gas, and probably with a simultaneous production of some free hydrogen derived from the decomposition of the water. The principal reaction, however, may be expressed as follows:

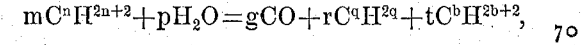
$$mC^nH^{2n+2} + pH_2O = gCO + rC^qH^{2q} + tC^bH^{2b+2},$$

$m$ representing an indefinite mixture of hydrocarbons of the paraffine series, such as is found in commercial petroleum both crude and refined, and $pH_2O$ an indefinite or varying quantity of water vapor given off from the zinc sulphate with the petroleum to produce varying quantities $g$ of the carbon-monoxide gas, (CO;) $r$, olefine series hydrocarbons, (gaseous members,) and $t$, hydrocarbons in indefinite quantity of the paraffin series, but of lower molecular weight than those that composed the petroleum before the reaction. The next reaction of the zinc sulphate with the petroleum under the influence of the heat comes after the water of the sulphate has been expelled and decomposed and the anhydrous zinc sulphate itself begins to decompose. As the proportions and conditions of this second reaction are uncertain and varying, like the first, it may be expressed thus:

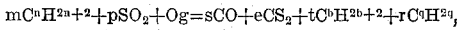
$$mC^nH^{2n+2} + pSO_2 + Og = sCO + eCS_2 + tC^bH^{2b+2} + rC^qH^{2q},$$

As seen above, sulphurous oxide and free oxygen are both given off from anhydrous zinc sulphate when it is strongly heated, and these two gaseous substances react, as above represented, with petroleum when under the influence of strong heat. The oxide of zinc (ZnO) which is left after this second reaction is reduced to metallic zinc by the hot petroleum vapor, with the probable production of more carbon-monoxide gas, (CO.) The metallic or reduced zinc itself in a highly-heated condition in the presence of the hot hydrocarbon vapors enters into reaction with the hydrocarbons to produce a volatile compound containing zinc. The exact nature of this reaction and the composition of its products are unknown; but it may possibly be expressed thus:

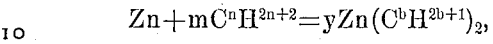
$$Zn + mC^nH^{2n+2} = yZn(C^bH^{2b+1})_2,$$

the hydrocarbon splitting, one atom of zinc replacing two atoms of hydrogen, and the resultant zinc-hydrocarbon compound having fewer atoms of both carbon and hydrogen than the paraffine from which it is derived. This volatile zinc hydrocarbon is decomposed by contact with the water in the gas-holder with precipitation of zinc hydrate [$Zn(OH)_2$] in the water, and simultaneous production of a paraffin-gas having such a relatively large proportion of hydrogen as to make it very effective in preventing deposition of solid carbon in the holes of the gas-burner.

What I claim to be new, and desire to secure by Letters Patent, is—

The herein described process of preventing the charring or carbonizing of the oil in the pipes, consisting in mixing with the oil in the pipes a solution of zinc sulphate, then subjecting the mixture of oil and zinc sulphate in the coils or pipes to heat for the purpose of converting the oil into gas, and then conveying the gas to a burner, or gasometer or other holder prepared to receive it, substantially as described.

In testimony whereof I affix my signature in presence of two witnesses.

JOHN JAY LOONEY.

Witnesses:
WILLIS JORDAN,
ALLEN A. RAMSEY.